J. M. AVERY.
ELASTIC TIRE.
APPLICATION FILED JAN. 30, 1918.

1,283,033.

Patented Oct. 29, 1918.
2 SHEETS—SHEET 1.

WITNESSES:
C. H. Ellis

INVENTOR.
J. M. Avery
BY
Jack Ashby
ATTORNEY.

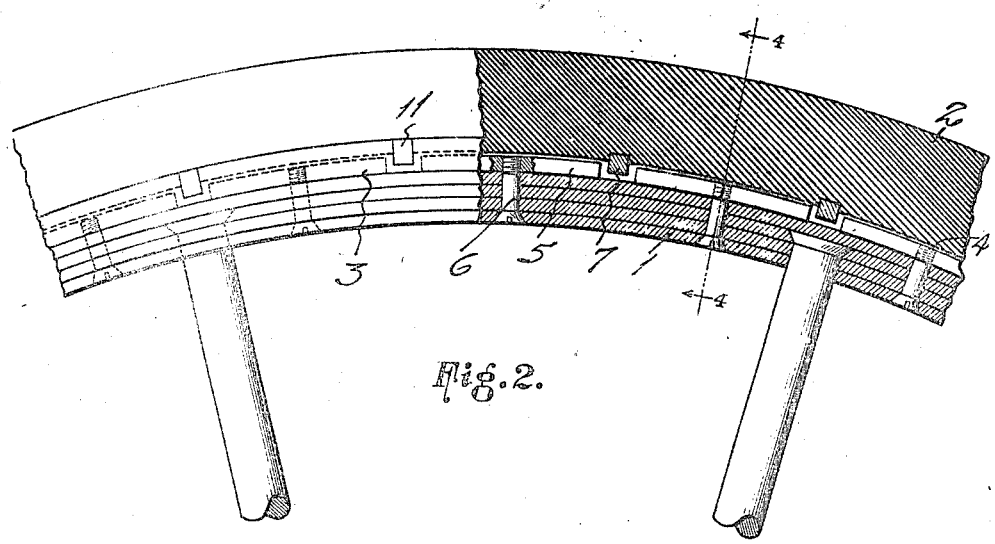
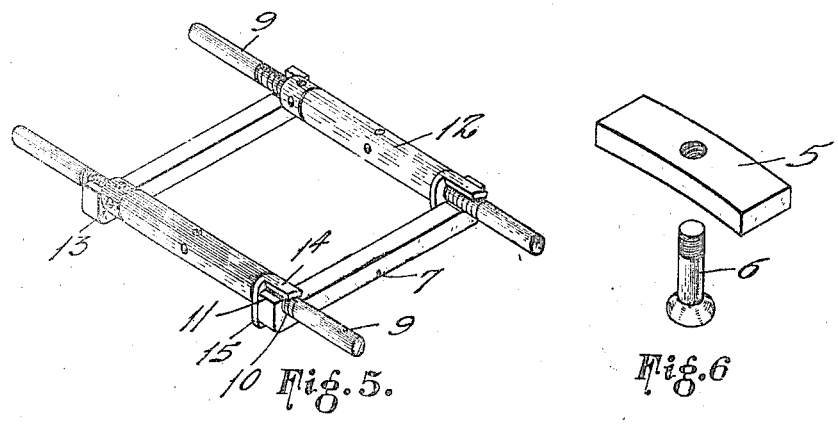
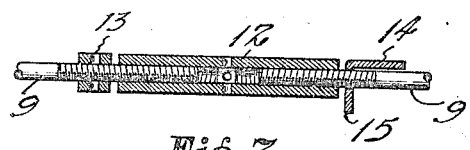

UNITED STATES PATENT OFFICE.

JOHN M. AVERY, OF DALLAS, TEXAS.

ELASTIC TIRE.

1,283,033.  Specification of Letters Patent.  Patented Oct. 29, 1918.

Application filed January 30, 1918. Serial No. 214,531.

*To all whom it may concern:*

Be it known that I, JOHN M. AVERY, a citizen of the United States, residing at Dallas, in the county of Dallas and State of Texas, have invented certain new and useful Improvements in Elastic Tires, of which the following is a specification.

This invention has particular relation to a solid elastic tire.

The idea involved is to provide a solid elastic tire with means whereby it is securely disposed on the rim of a wheel and held against displacement both laterally and circumferentially and in a novel manner; also to provide fastening rings and so arrange the same that they are held against circumferential movement relatively of the tire.

In carrying out the invention I provide a solid elastic tire which may be made of rubber and fabric or any other suitable material. The tire is formed in its base with a central circumferential channel which is adapted to receive projections on the rim of the wheel whereby the tire is fastened against lateral displacement. Cross bars are embedded in the base of the tire and have seats at their ends which conform to circumferential marginal seats or channels in the base of the tire receiving the retaining rings. Bars are exposed in the channels so that the projections on the rim will be in their path and thus the tire is prevented from moving circumferentially of the wheel or "creeping." These bars also may serve to fasten the rings against circumferential movement. It is evident that equivalent constructions might be evolved and various details worked out.

Figure 1:
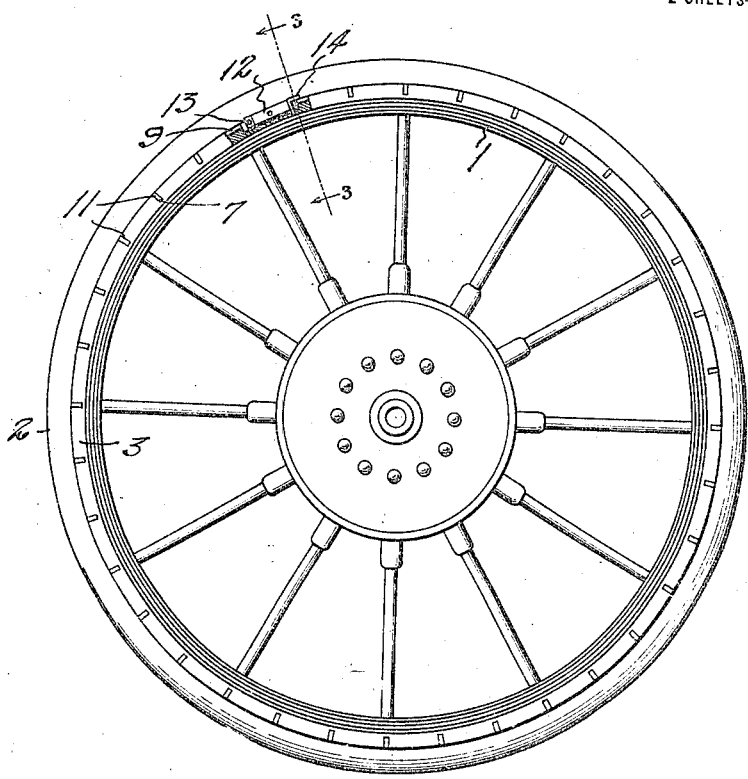
Figure 3:
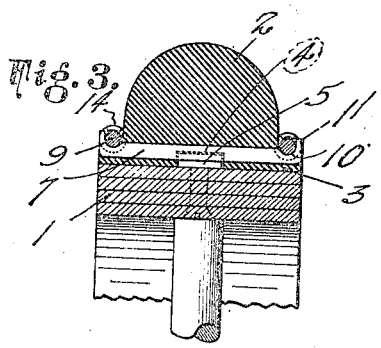
Figure 4:
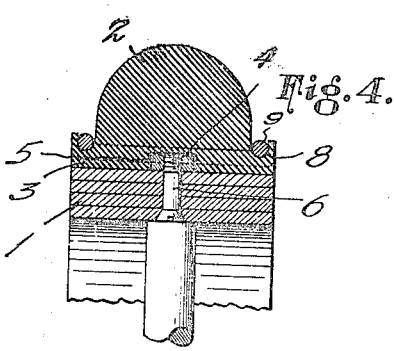

The invention will be more readily understood from a reading of the following specification and by reference to the accompanying drawings, in which an example of the invention is illustrated, and wherein, Figure 1 is a side elevation of a wheel equipped with a tire constructed in accordance with this invention, Fig. 2 is an enlarged detail of a portion of the wheel and tire, being illustrated both in section and in elevation, Fig. 3 is a transverse sectional view taken on the line 3—3 of Fig. 1, Fig. 4 is a transverse sectional view taken on the line 4—4 of Fig. 2, Fig. 5 is a perspective view showing the fastening means of the retaining rings and the cross bars associated therewith, Fig. 6 is a perspective view of one of the lugs and fastening screws, and Fig. 7 is a longitudinal sectional view of one of the ring fastenings.

In the drawings the numeral 1 designates the rim of a vehicle wheel. It is to be understood that while this tire is shown applied to a resilient rim it may be used on various kinds of wheels with good results and its use is not limited to a resilient wheel, although it is more particularly designed for use with such a wheel.

Side flanges are not used with this tire and a rim with a smooth contiguous surface is employed. An elastic tire 2 formed of rubber, rubber and fabric or any other suitable material is provided with a base 3 which projects laterally on each side of the tread of the tire which is rounded in cross section. The base rests in contact with the rim 1 as shown. The tire has a circumferential central channel 4 in its base and this channel receives lugs 5 mounted on the periphery of the rim and fastened thereto by screws 6. These lugs are mounted entirely around the wheel and have their ends slightly spaced apart. It is obvious that since the lugs project into the channel, the angular cross sectional structure of these parts will prevent lateral displacement of the tire from the rim.

Transverse bars 7 extend through the base of the tire and are embedded so as to leave some of the material of the tire between the said bars and the inner surface of the tire. These bars are preferably formed of metal but could be made of other stout material. The bars are disposed between the ends of the lugs and project into the channel 4 so as to engage said lugs if the tire tends to move circumferentially of the rim. The base at each side of the tire is provided with a circumferential channel or annular seat 8 deep enough to receive a retaining ring 9. The bars 7 have seats 10 and upstanding studs 11 which prevent lateral displacement of the rings.

The retaining rings 9 serve to fasten the tire on the rim. Each ring has its ends screw-threaded in a turn buckle sleeve 12 whereby the ends of the ring may be spread apart or drawn together. On one end a jam collar 13 is arranged to bind against the end of the sleeve to lock it in position, while on the other end of the ring a clip 14 is mounted. This clip has an enlarged ear 15 which projects into the path of the adjacent cross bar 7, and should the ring tend to move circumferentially of the tire said ear would engage one of the cross bars and prevent such movement. Of course, various forms of fastening devices could be used. It will be seen that the edges of the tire might have a tendency to roll or turn up if the retaining rings were not used and the elastic material could be more readily displaced and distorted.

In applying the tire it is forced on the rim with suitable tools (not shown) so that the lugs 5 are received in the channel 4 with the cross bars 7 between the ends of the lugs. The retaining rings 9 which have not been placed in the seats are adjusted by turning the sleeves 12 so that their diameters are sufficient to permit placing the same in the said seats and with the ears 15 adjacent one of the bars 7. By turning the sleeves 12 with a suitable tool the ends of the rings are drawn together and the rings drawn tightly into the seats 8 of the base and the seats 10 of the bars whereby the tire is firmly secured on the rim. Then by turning the jam nuts 13 until they bind against the ends of the sleeves the latter are locked against turning.

What I claim is,

1. A solid cushion tire comprising a base having a circumferential channel for receiving rim fastening means, the said base having annular retaining-ring seats, and transverse cross bars mounted in the base and having their ends terminating at the ring seats of its base.

2. In a solid elastic tire, an extended base having a circumferential channel for receiving rim fastening means, said base also having annular ring seats on each side of its tread portion, transverse cross bars extending through the base and having their ends exposed at the annular seats of the base, retaining rings mounted in the said seats of the base, and projections on the cross bars extending transversely of the rings for preventing lateral displacement of the same.

3. In a solid elastic tire, an extended base having a circumferential channel for receiving rim fastening means, said base also having annular ring seats on each side of its tread portion, transverse cross bars extending through the base and having their ends exposed at the annular seats of the base, retaining rings mounted in the said seats of the base, projections on the cross bars extending transversely of the rings for preventing lateral displacement of the same, and means mounted on the rings located to engage the cross bars to prevent circumferential movement of the rings relatively of the tire.

4. The combination with the rim of a wheel having projections on its periphery, of an elastic tire having a circumferential channel receiving the projections of the rim, cross bars carried by the tire and projecting into the channel so as to engage the projections on the rim to prevent circumferential movement of the tire on the rim, and means for fastening the tire on the rim.

5. The combination with the rim of a vehicle wheel having a plurality of spaced lugs on its periphery, of an elastic tire fitting snugly on the rim and having a circumferential channel receiving the lugs whereby it is fastened against lateral displacement from the rim, the tire having annular ring seats at each edge of its base portion, cross bars extending transversely through the tire with portions projecting into the channel between the ends of the rim lugs, retaining rings mounted in the seats of the tire, means for fastening the rings in position, and projections on the cross bars holding the rings against lateral displacement from the tire.

6. In an elastic tire, a tread portion, a base portion having annular seats on each side of the tread portion, cross bars extending through the base and exposed at the seats, retaining rings mounted in the seats, and means for fastening the ends of the retaining rings together and securing them in the seats of the base, in combination with devices mounted on the rings so as to engage the cross bars and prevent relative circumferential movement of said rings.

In testimony whereof I affix my signature.

JOHN M. AVERY.